(12) United States Patent
Beutler

(10) Patent No.: US 12,313,206 B2
(45) Date of Patent: May 27, 2025

(54) SECONDARY CONTAINMENT FOR OPERABLE VALVES

(71) Applicant: Georg Fischer Harvel LLC, Little Rock, AR (US)

(72) Inventor: Michael Paul Beutler, Cabot, AR (US)

(73) Assignee: Georg Fischer LLC, Irvine, CA (US)

( * ) Notice: Subject to any disclaimer, the term of this patent is extended or adjusted under 35 U.S.C. 154(b) by 0 days.

(21) Appl. No.: 18/243,374

(22) Filed: Sep. 7, 2023

(65) Prior Publication Data

US 2025/0084947 A1    Mar. 13, 2025

(51) Int. Cl.
| | |
|---|---|
| *F16L 55/168* | (2006.01) |
| *F16K 27/12* | (2006.01) |
| *F16L 59/16* | (2006.01) |

(52) U.S. Cl.
CPC ............ *F16L 55/168* (2013.01); *F16L 59/161* (2013.01); *F16K 27/12* (2013.01); *F16L 2201/20* (2013.01); *F16L 2201/30* (2013.01)

(58) Field of Classification Search
CPC . F16L 2201/20; F16L 2201/30; F16L 58/187; F16L 58/18; F16L 55/16; F16L 55/168; F16L 55/17; F16L 55/178; F16L 59/161; F16K 27/12
See application file for complete search history.

(56) References Cited

U.S. PATENT DOCUMENTS

| | | | |
|---|---|---|---|
| 2,954,797 A | * | 10/1960 | Dryer |
| 4,046,406 A | * | 9/1977 | Press ..................... F16L 59/161 |
| 4,282,743 A | | 8/1981 | Pickett |
| 4,903,719 A | * | 2/1990 | Rains ..................... F16K 27/12 |
| 4,976,366 A | | 12/1990 | Russell |
| 5,022,685 A | | 6/1991 | Stiskin et al. |
| 5,141,256 A | * | 8/1992 | Ziu |
| 5,228,472 A | | 7/1993 | Ougiya et al. |
| 5,546,977 A | | 8/1996 | Chaney |
| 5,947,141 A | | 9/1999 | Nuss |

(Continued)

FOREIGN PATENT DOCUMENTS

| | | | |
|---|---|---|---|
| CN | 206647562 U | * | 11/2017 |
| CN | 113251240 A | * | 8/2021 |
| KR | 101196439 B1 | | 11/2012 |

OTHER PUBLICATIONS

CN-206647562-U—Machine Translation—English (Year: 2017).*
CN-113251240-A—Machine Translation—English (Year: 2021).*

*Primary Examiner* — William S. Choi
(74) *Attorney, Agent, or Firm* — Harness, Dickey & Pierce, P.L.C.

(57) ABSTRACT

A secondary containment system for a primary pipe system having primary pipes connected by a connection point having a valve. The secondary containment system having longitudinally divided first and second shells larger than and disposed around the connection point of the primary pipes. Each shell having longitudinally extended edges on opposite sides and arcuate openings at opposite ends. A sealing gasket is provided having arcuate end portions connected by longitudinally extending strips. A series of removable clamps is used for clamping the edges of the first and second shells together, with the sealing gasket being sandwiched between the two shells. A valve stem adapter extends through one of the shells and is configured to rotate the valve in the primary piping system.

14 Claims, 11 Drawing Sheets

(56) References Cited

U.S. PATENT DOCUMENTS

| | | | |
|---|---|---|---|
| 6,164,345 A * | 12/2000 | Haddox | F16L 55/168 |
| 6,244,290 B1 * | 6/2001 | Reicin | F16K 27/12 |
| 2003/0184083 A1 * | 10/2003 | Linam | |
| 2008/0265196 A1 | 10/2008 | Hoffman | |
| 2014/0131991 A1 * | 5/2014 | Bellis | |
| 2023/0175624 A1 | 6/2023 | Breyer et al. | |

* cited by examiner

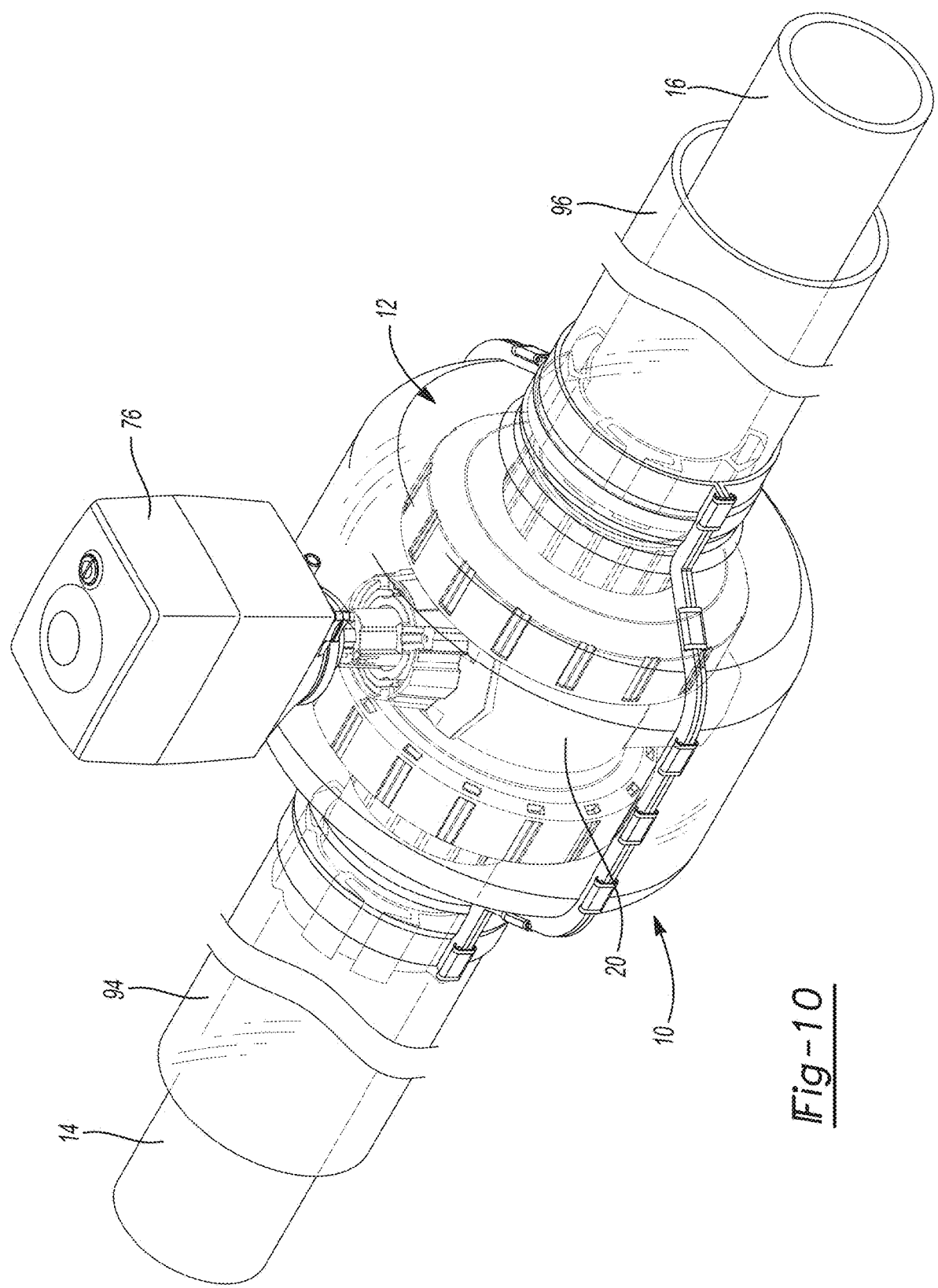

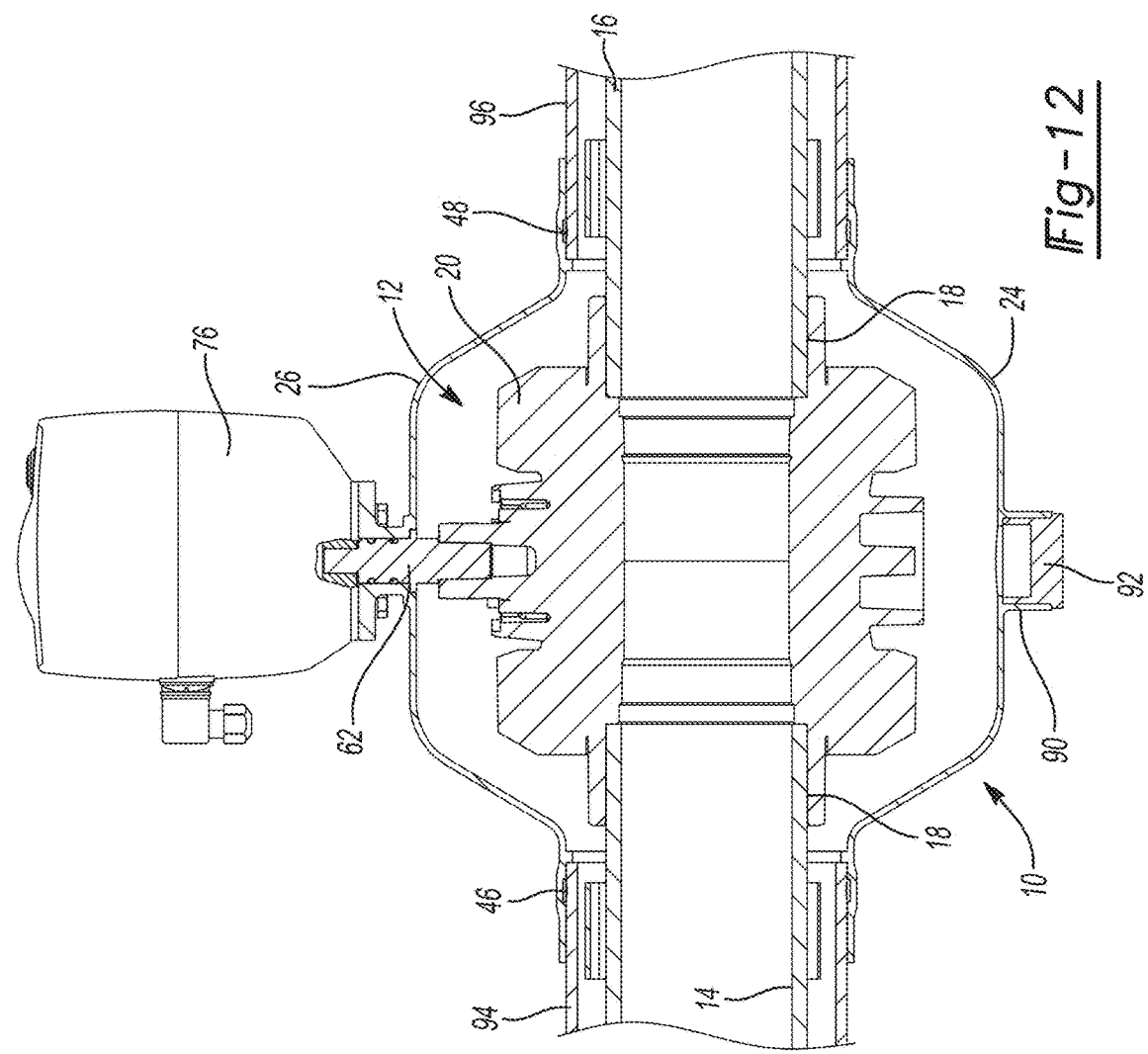
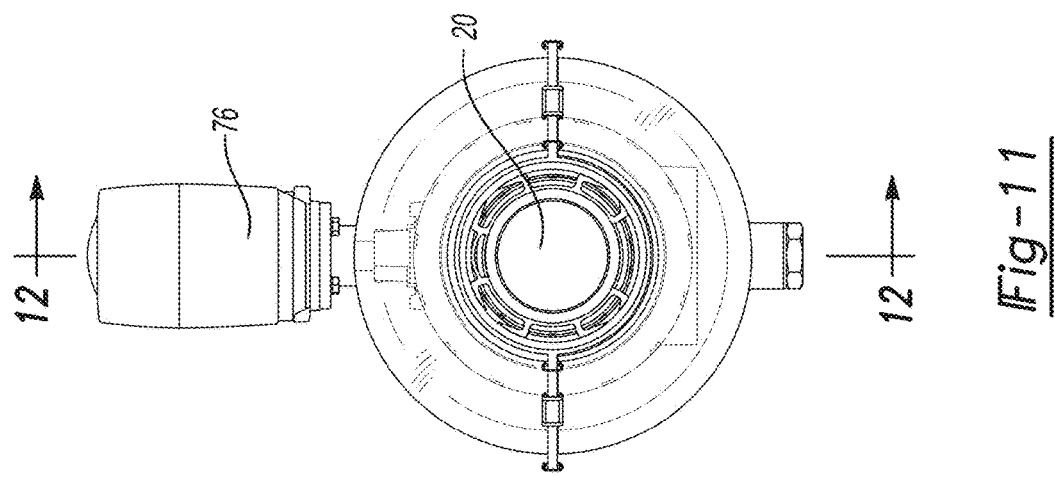

SECONDARY CONTAINMENT FOR OPERABLE VALVES

FIELD

The present disclosure relates to piping systems and, more particularly, to systems for containing primary piping systems.

BACKGROUND OF THE INVENTION

This section provides background information related to the present disclosure which is not necessarily prior art.

This invention relates to secondary containment systems for preventing the escape of materials that may leak from a primary containment system, and has particular reference to a secondary containment system for a primary pipe system of pipes joined together in various configurations by pipe joints having heat fusion ends, pipe sockets or threads for receiving the ends of the pipes. The secondary containment pipes are secured and sealed with sockets intended to prevent leakage into the atmosphere of the fluid from the primary piping system.

Protection of the environment from pollution by leakage from primary piping systems is a major problem today and is receiving increasing attention, from both industry and government. More and more attention and effort is being devoted to both clean-up of existing spills and prevention of further contamination by existing and new containment systems. The consequences of such spills have been very serious, and the expense of clean-up efforts can be enormous, making it both environmentally and economically important to prevent leakage of hazardous materials, typically chemical and petroleum products but also including sewage.

Governmental regulations in the United States have expanded the requirements of secondary containment on many new installations, such as chemical storage systems, and will require secondary containment be added on many pre-existing systems in coming years. Even now, there are existing primary pipe systems that are leaking, or susceptible to leaking, so as to require the installation of protective secondary containment systems. There is, therefore, a significant need for a practical and economical secondary containment system.

Several different approaches have been suggested for the secondary containment problem, one of the relatively recent approaches being described in U.S. Pat. No. 4,786,088. This patent discloses a double-containment thermoplastic pipe assembly comprising a containment pipe and carrier pipe joined by relatively complex restraint couplings and pipe joints, some of the latter being of a split configuration to be permanently welded together around a primary pipe joint. Other secondary containment approaches are identified or discussed in the Background section of this patent, along with some generally related dual systems, connectors and the like.

Another example of a dual system is U.S. Pat. No. 4,374,596, which discloses an electrical duct connector with longitudinally divided pipe sections and pipe fittings that can be snapped together. U.S. Pat. No. 3,572,395 shows a generally similar split elbow joint. Other representative prior secondary containment pipe systems and elements are shown in U.S. Pat. Nos. 3,721,270, 3,802,456, 4,422,675 and 4,673,926, all concerned with the containment of leakage from primary pipes and joints. The '926 patent illustrates an important auxiliary feature of such systems, the provision of leak detection and signaling means in the secondary containment systems, so that corrective action can be taken to terminate leakage from the primary system into the secondary system.

Yet another approach, used by Harrington Industrial Plastics, Los Angeles, Calif. and elsewhere, has been the use of standard thermoplastic pipe and fittings, of a material such as polyvinylchloride ("PVC"), with oversize secondary containment pipes telescoped over the primary pipe and joined over the conventional primary pipe joints by oversize secondary containment fittings that have been cut, usually by sawing, into two pieces that can be reassembled, clamshell fashion, around the primary pipe joint. These fittings then are bonded together, as by hot-welding of the saw-cut edges, and are suitably sealed to the secondary pipes, usually with a sealing cement. Arcuate spacers with radially extending fingers have been provided in different sizes to maintain the two pipe systems in spaced coaxial relation.

U.S. Pat. No. 5,022,685 provides another possible solution for this issue.

Despite all of these prior efforts to provide effective, practical and reasonably priced secondary containment systems, there as yet is no system that is completely satisfactory. Many suffer from undue complexity and cost in manufacture, assembly, or installation, and most are not capable of being practically applied to an existing primary system, to provide effective secondary containment on a retrofit basis.

Many of the commercially available products are simple boxes with bolted covers that require disassembly of the box to open, close or maintain the valve. Other options include valves permanently enclosed in pipes or other valves, i.e., a valve in a valve allowing for no or little access to the valve.

SUMMARY

This section provides a general summary of the disclosure, and is not a comprehensive disclosure of its full scope or all of its features.

According to one aspect of this invention, a secondary containment system for primary pipe system having primary pipes connected by connection point is provided. The secondary containment system has longitudinally divided first and second shells larger than and disposed around the connection point of the primary pipes. A sealing gasket is provided as is a removable clamp for clamping edges of the first and second shells together, with the sealing gasket being sandwiched between the two shells. A valve extension adapter extends through one of the shells. The adapter has a stem, and a lower portion of the stem is configured to engage a valve in the primary pipe system. An actuator engaging an upper portion of the adapter moves or rotates the adapter to cause movement of the valve to an open or closed position in the primary piping system without disengaging the sealing arrangement of the secondary containment system about the primary piping system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 10 is a perspective view of the secondary containment system in use with an electric actuator;

FIG. 11 is a cross-sectional view of the embodiment shown in FIG. 10;

FIG. 12 is a cross-sectional view taken along the lines 12-12 of FIG. 11;

Corresponding reference numerals indicate corresponding parts throughout the several views of the drawings.

DETAILED DESCRIPTION

Figure 1:
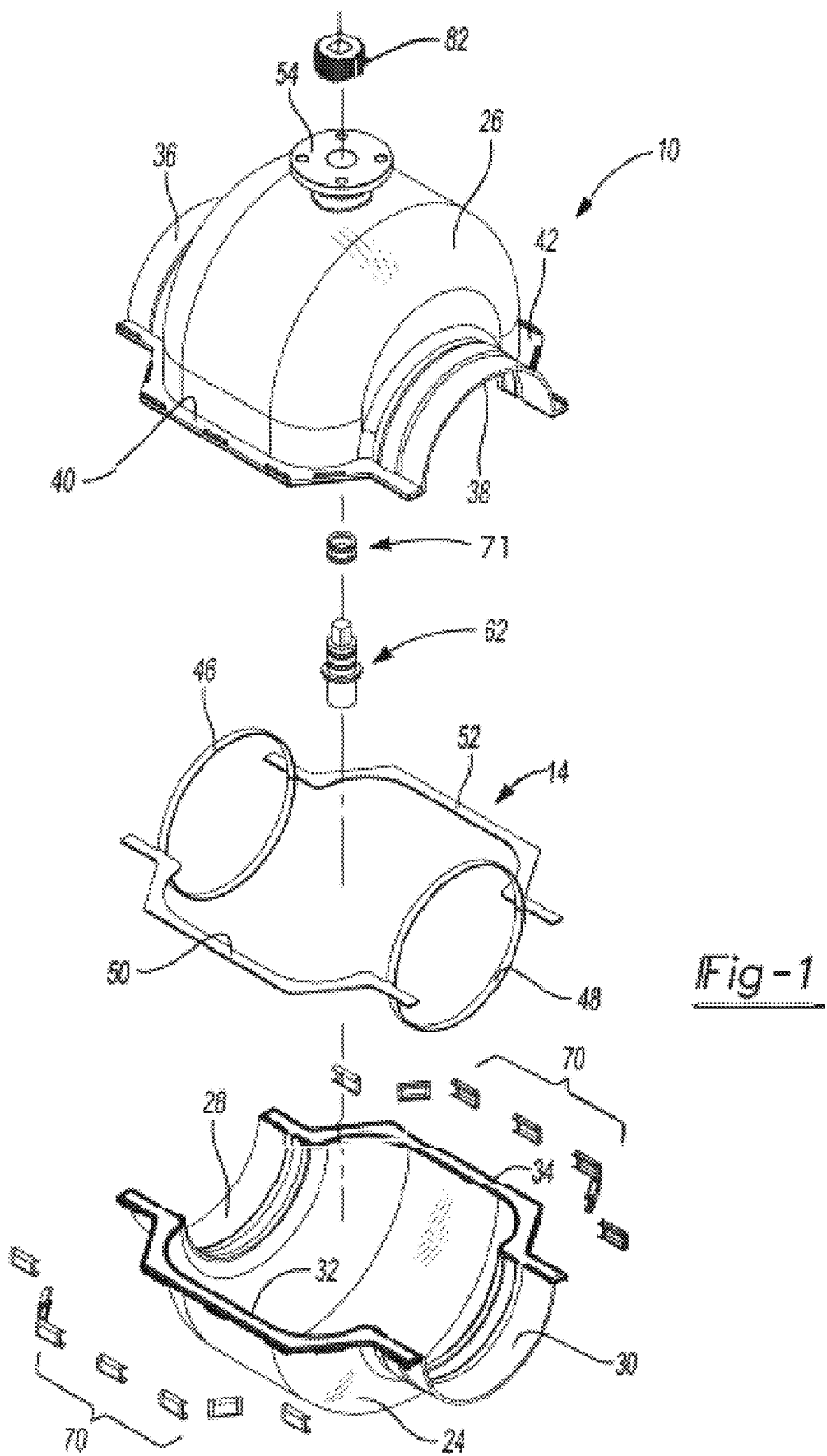
FIG. 1 is an exploded perspective view of a secondary containment system made in accordance with the teachings of this invention.

Example embodiments will now be described more fully with reference to the accompanying drawings.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 13:
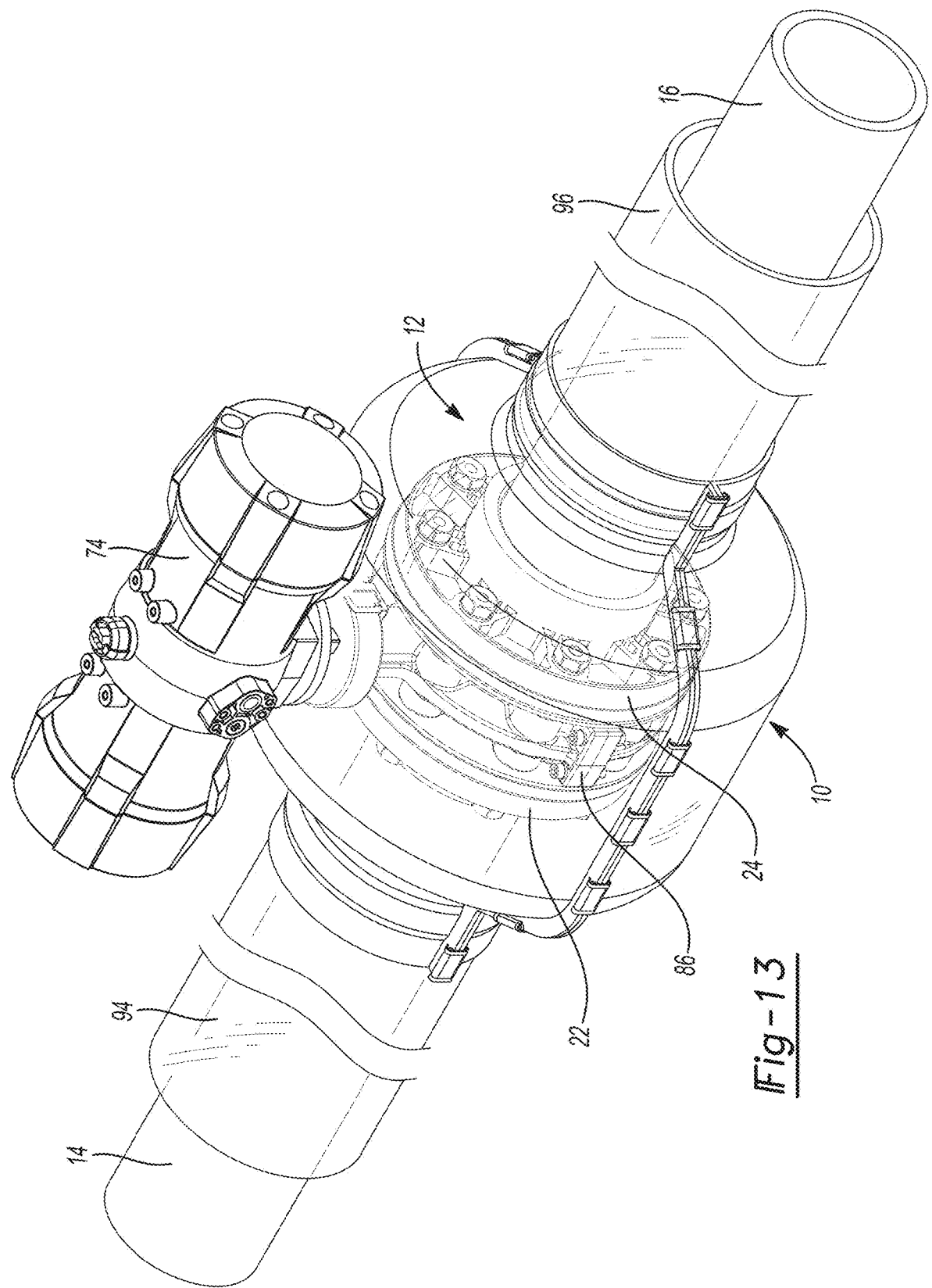
FIG. 13 is a perspective view of the secondary containment system in use with a flange connection point in use with a butterfly valve and a pneumatic actuator.

Referring now to the drawings, a secondary containment system is generally designated by the numeral 10. Its primary function is to encase a primary piping system which is generally designated by the numeral 12. The primary piping system typically contains two pipes 14 and 16 which are connected together by a connection point 18. The connection point 18 can take various forms such as a valve 20 as shown in FIGS. 4-12. Alternatively, there is a mechanically connected valve 86 mated together by way of a pair of flange connections 22,24 as shown in FIG. 13 or, perhaps, no valve serving as a connection point but the pipes are simply mated together by way of a pair of flange connections 22,24. Although the pipes are shown as short pieces in the drawings, in practice, pipes 94, 96 of the containment system 10 surround substantially the entire lengths of the pipes 14, 16 of the primary piping system.

The present invention is particularly advantageous when the secondary containment system 10 surrounds a primary piping system 12 that carries toxic fluids that should not be released to the atmosphere. In such primary piping systems it is often required to test the integrity of the connection point or otherwise do maintenance to the connection point or other parts of the primary piping system 12. The secondary containment system 10 allows the user to conduct such testing or maintenance in an easy and safe manner.

Figure 2:
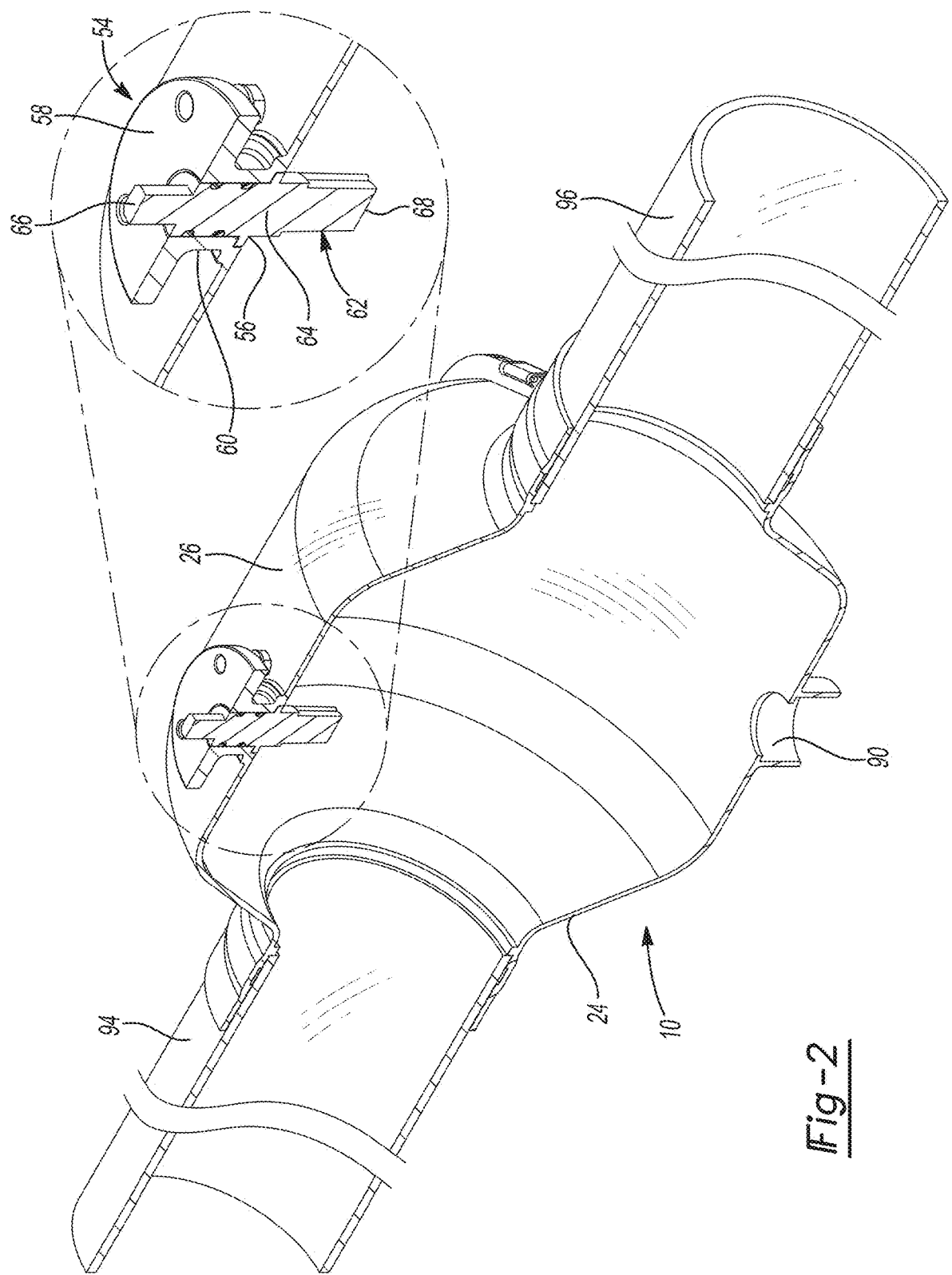
FIG. 2 is a perspective view of the secondary containment system.

Referring back to FIG. 1 and FIG. 2, the containment system 10 includes a pair of translucent mating shells 24, 26. Shell 24 includes an arcuate opening 28 for receiving pipe 94 of the containment piping system 10. At an opposite end of shell 24 there is a similarly located arcuate opening 30 receiving pipe 96 of the containment piping system 10. Bridging openings 28 and 30 are pair of longitudinally extending edges 32 and 34 that are bent outwardly. Mating shell 26 likewise contains arcuate openings 36 and 38 connected together by edges 40 and 42.

Figure 3:
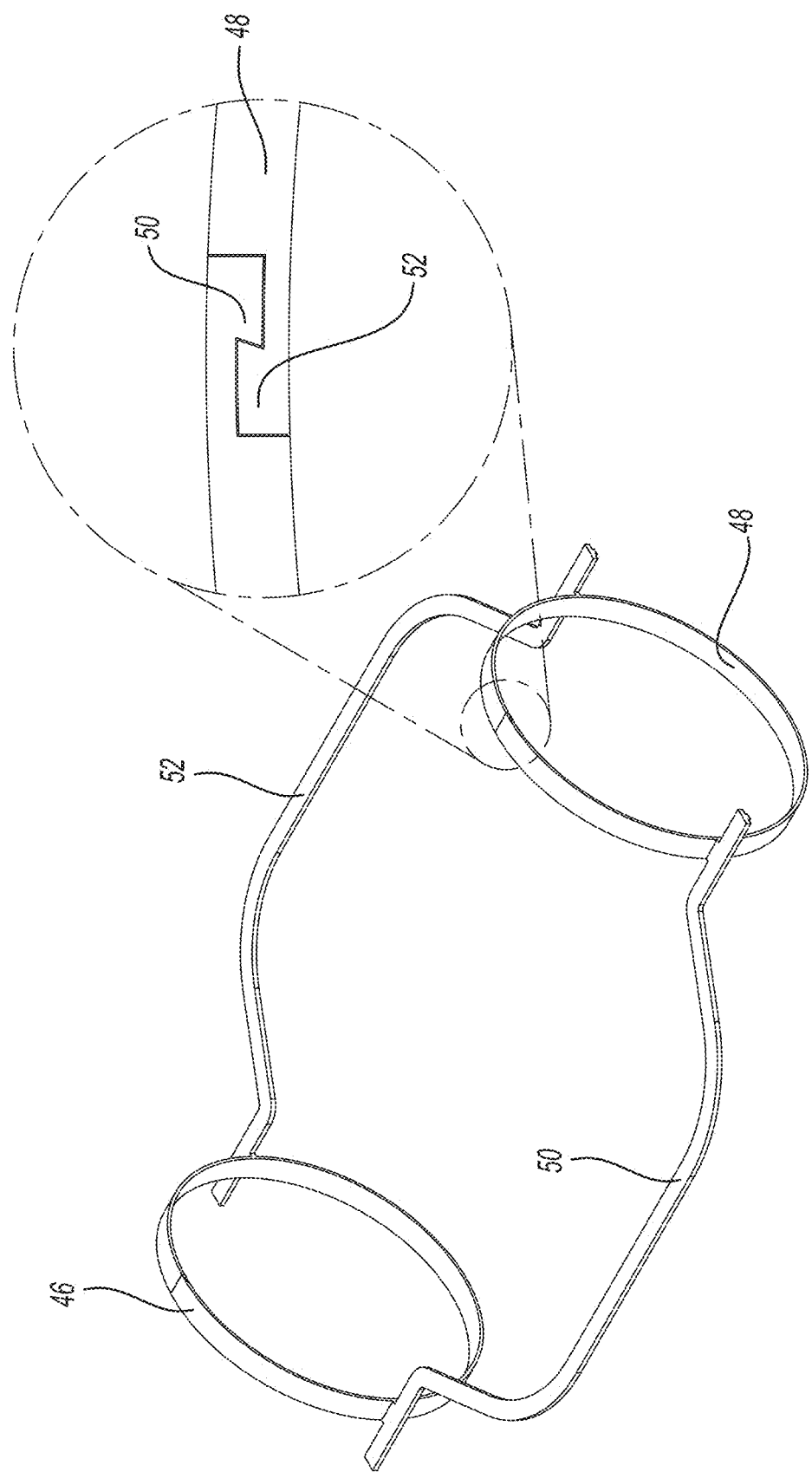
FIG. 3 is a perspective view of a preferred one piece sealing gasket.

An elastomeric gasket 14 is provided for sealing the shells 24 and 26 together about the pipes 94,96 of the containment piping system 10. Gasket 14 includes a pair of arcuate end members 46 and 48 which respectively seal the containment system 10 about pipes 94 and 96. As shown in FIG. 3, each of the arcuate members 46 and 48 are preferably split and joined together by mating dove tailed ends 50 and 52. The gasket end members 46, 48 are connected together by a pair of longitudinally extending strips 50 and 52 which respectively correspond in shape to the edges 32, 34 and 40, 42 of the shells 24 and 26.

Referring back to FIGS. 1 and 2, shell 26 is provided with a receptacle 54 that extends from an outer surface of shell 26 and surrounds an opening 56 in shell 26. The receptacle 54 has an enlarged upper flange 58 that tapers to a neck 60 extending between the opening 56 and flange 58. A valve stem adapter 62 includes a stem 64 extending through neck 60. The stem 64 includes an upper fitting 66 and a lower fitting 68 for engaging the valve 20 in the primary piping system 12. A series of O-rings 71 provide a seal between the stem 64 of the valve stem adapter 62 and the neck 60 of receptacle 54.

To assemble the secondary containment system 10 about the primary piping system 12, the gasket 14 is placed around the pipes 94, 96. Because the arcuate and members 46, 48 of the gasket 14 are split, they can be spread open and arranged around the pipes 94, 96 and then snapped back together due to the dovetailed ends 50, 52. Then, the shells 24, 26 are brought together with the gasket 14 being sandwiched between the shells, 24,26. The shells 24, 26 are temporarily connected together by way of a series of removable clamping clips generally designated by the numeral 70.

Figure 4:
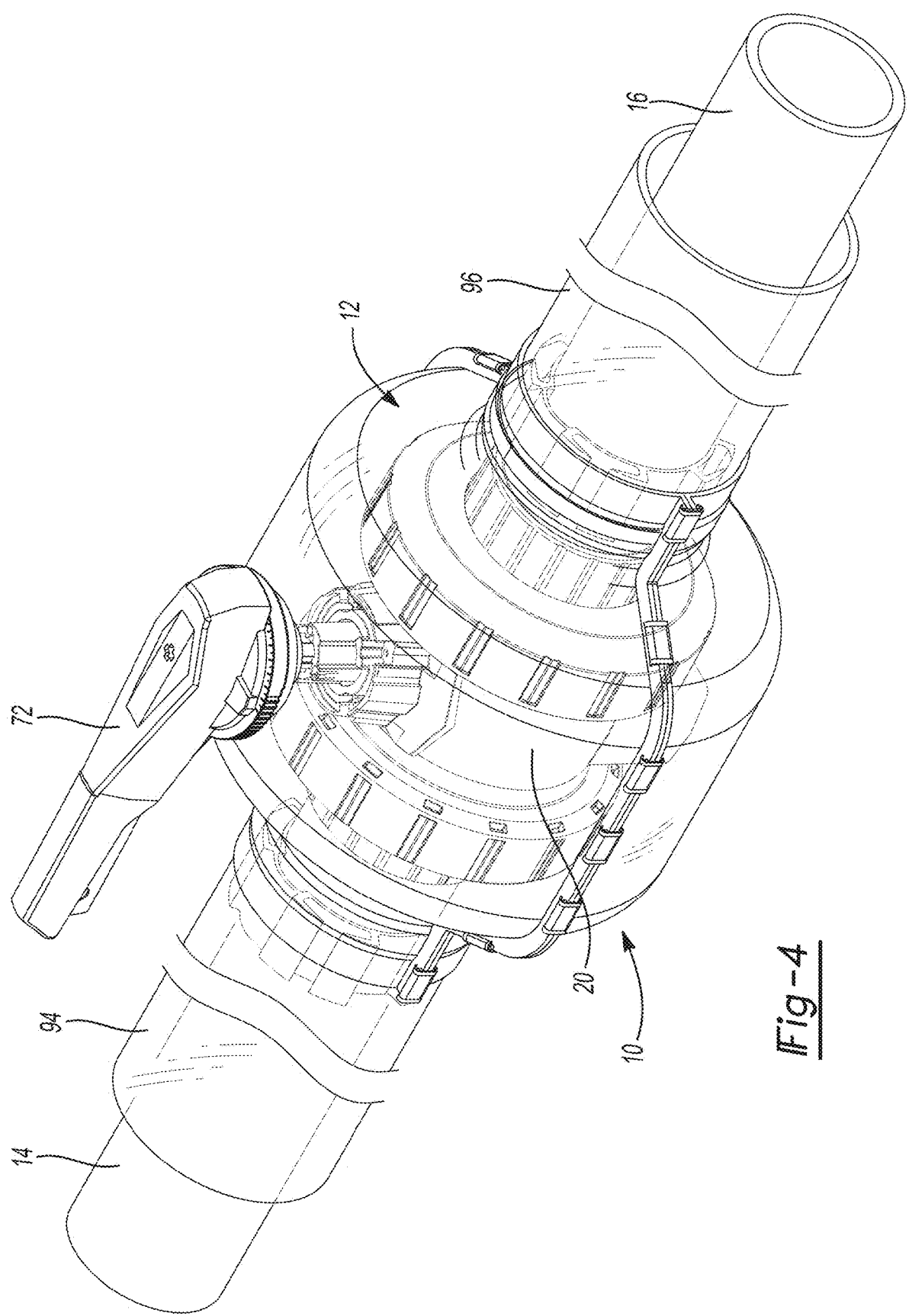
FIG. 4 is a perspective view of the secondary containment system in use with a manual handle.
Figure 6:
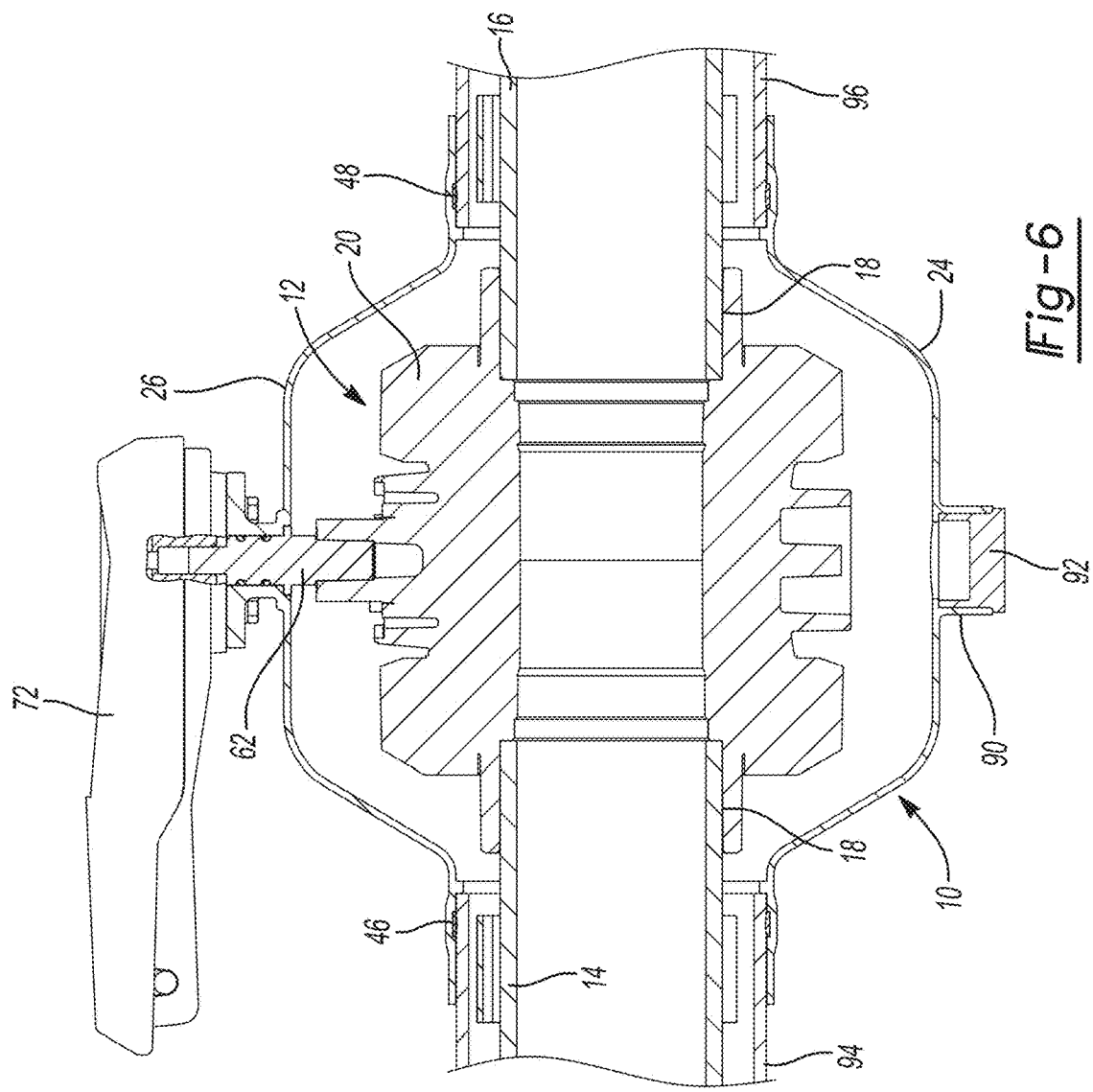
FIG. 6 is a cross-sectional view taken along the lines 6-6 of FIG. 5.
Figure 5:
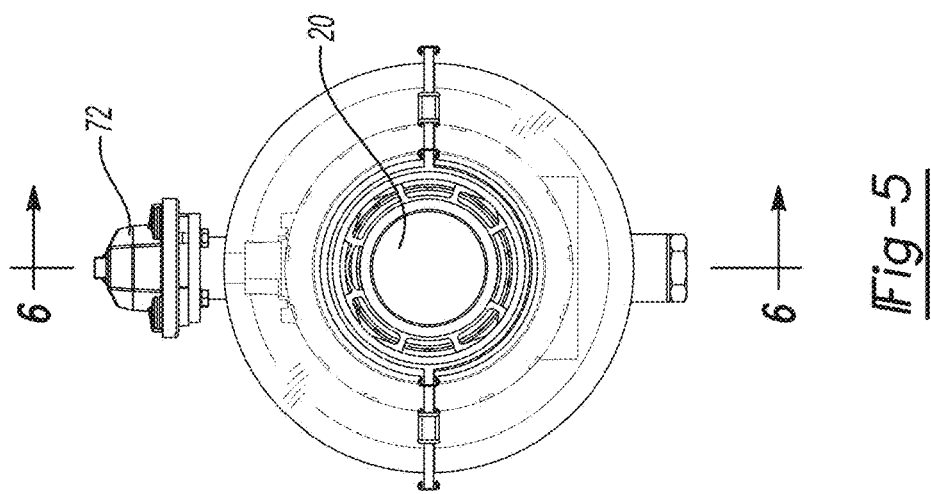
FIG. 5 is a cross-sectional view of the embodiment shown in FIG. 4.
Figure 7:
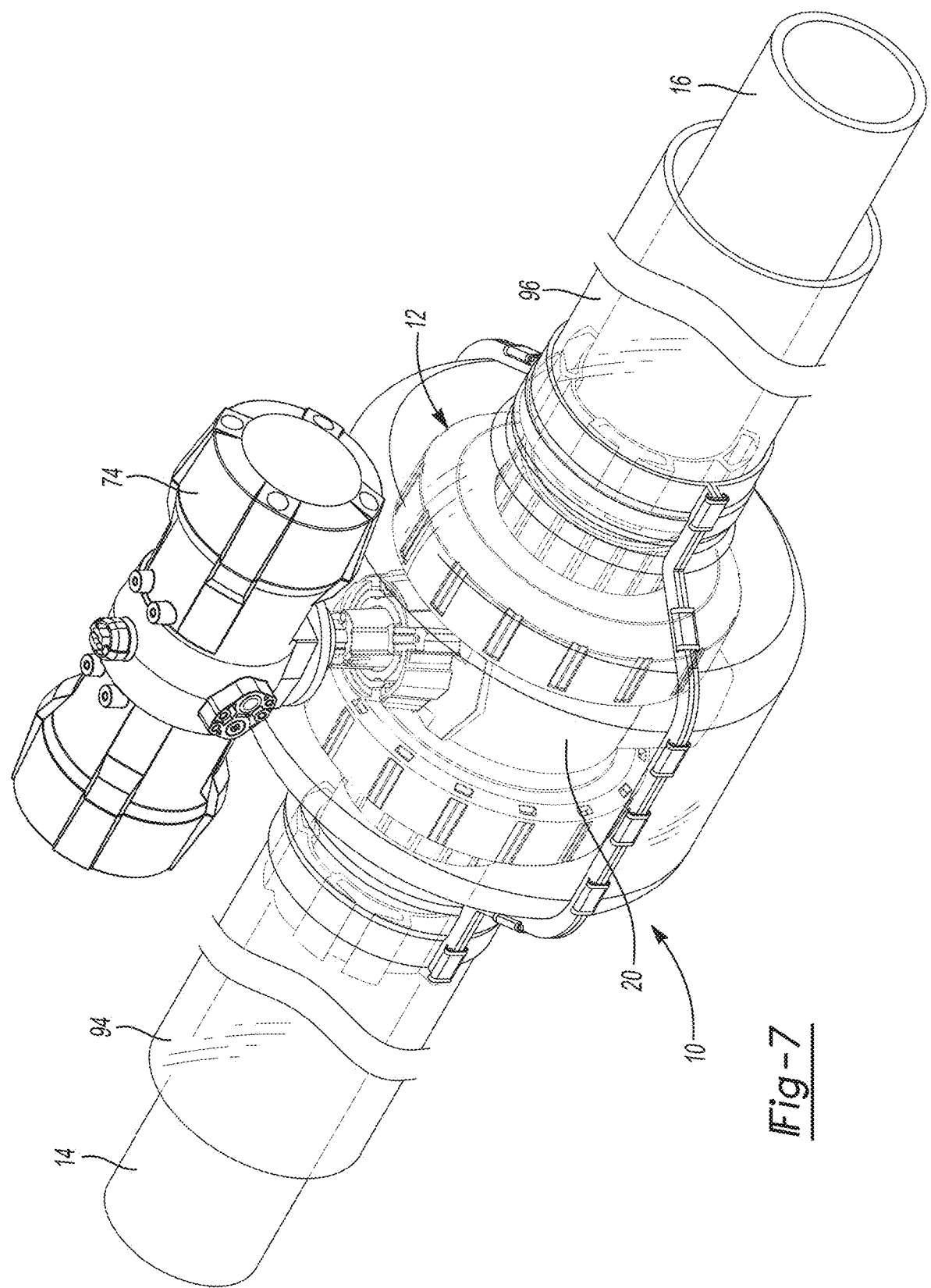
FIG. 7 is a perspective view showing the secondary containment system in use with a pneumatic actuator.
Figure 9:
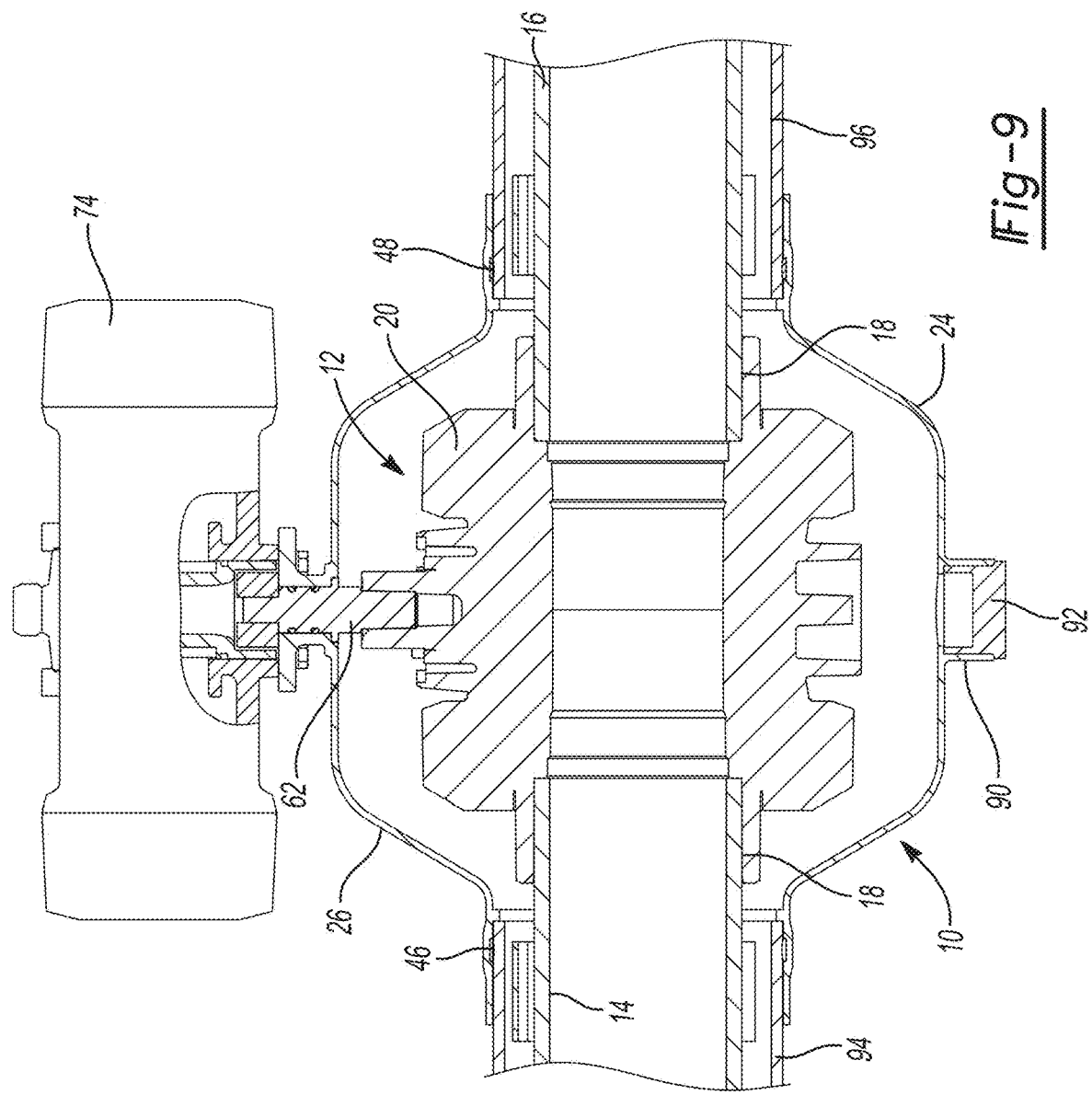
FIG. 9 is a cross-sectional view can along the lines 9-9 of FIG. 8.
Figure 8:
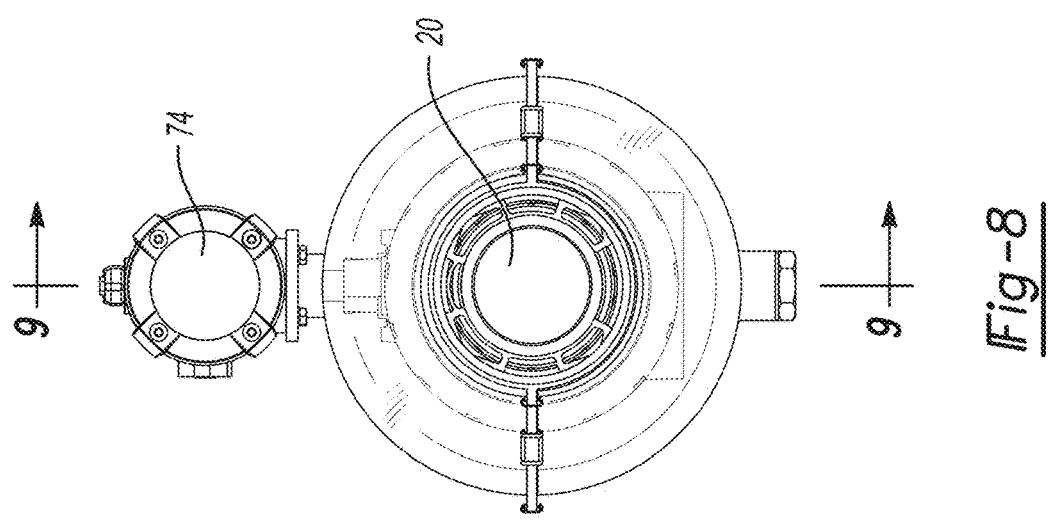
FIG. 8 is a cross-sectional view of the embodiment shown in FIG. 7.
Figure 14:
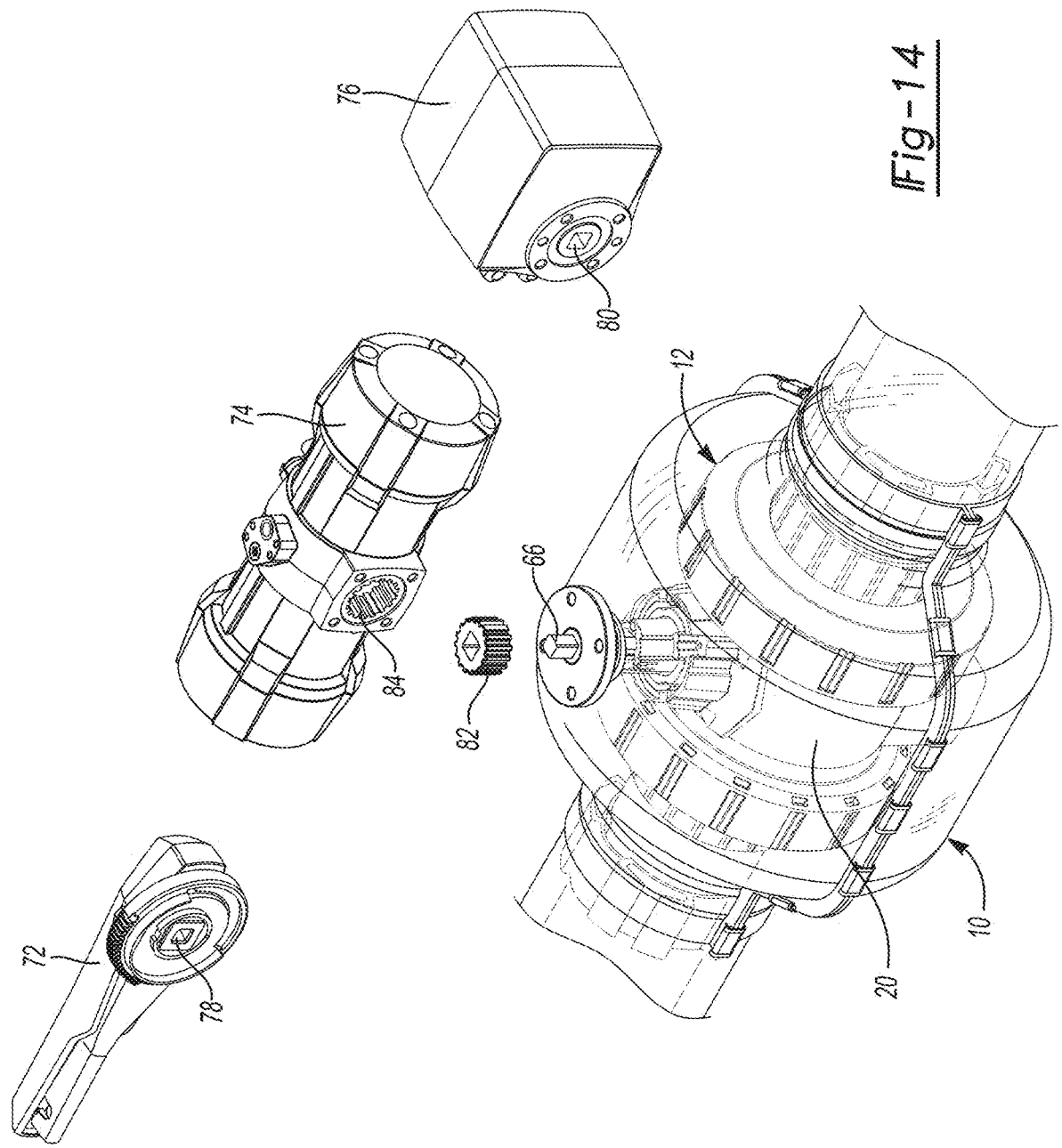
FIG. 14 is a perspective view showing examples of several actuators that can be alternately used with the secondary containment system.

One of the advantageous features of this invention is that the secondary containment system 10 can be used in connection with various different types of actuators. A manual actuator 72 or handle is shown in FIGS. 4-6. A pneumatic actuator 74 is shown in FIGS. 7-9. An electrical actuator 76 Is shown in FIGS. 10-12. The undersides of these three different actuators, 72, 74 and 76 are best shown in FIG. 14. Manual actuator 72 includes a socket 78 that engages the fitting 66 on the top of the valve extension adapter 62. Likewise, the electrical actuator 76 includes a socket 80 that similarly engages the fitting 66. The pneumatic actuator 74 employees a splined insert 82 that engages the fitting 66. The splines of insert 82 engage a rotating female socket 84 in the pneumatic actuator 74.

As shown, for example, in FIGS. 2, and 5-9, the lower portion of shell 24 includes a drain port 90 that can be sealed by a removable plug 92.

In the embodiment of FIG. 13 where there is a mechanically joined valve 86 on the primary piping system a pair of flanges 22, 24 serve as the connection point to the primary pipes. This mechanically joined valve 86 can be adapted to any one of the actuator options 72, 74 or 76 without interruption of the sealing of the secondary containment piping.

The secondary containment system 10 can be used for a variety of testing and maintenance purposes, all of which maintain the integrity of the sealed enclosure about the primary piping system. Consequently, leaks of the fluid flowing through the primary piping system are essentially prevented from escaping the secondary containment system. Among the types of testing and maintenance that can be accomplished are low pressure leak testing, less than 5 psi of the entire secondary containment system and changing or maintenance of the valve controls types 72,74 or 76 of the primary piping system without disruption of the sealed containment piping.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A secondary containment system for a primary pipe system having primary pipes connected by a connection point having a valve, said secondary containment system comprising:
   longitudinally divided first and second shells larger than and disposed around the connection point of the primary pipes;
   a sealing gasket;
   a removable clamp for clamping edges of the first and second shells together, with the sealing gasket sandwiched between the two shells;
   a valve extension adapter extending through one of the shells, the valve extension adapter being configured to move the valve; and
   wherein the sealing gasket includes arcuate end portions connected by longitudinally extending strips, the arcuate end portions being configured to engage outer surfaces of pipes in the primary piping system, the strips being sandwiched between edges of the first and second shells; and wherein the arcuate end portions of the sealing gasket are split and have interlocking ends.

2. The secondary containment system of claim 1 which further comprises:
   the adapter having a stem, a lower portion of the stem being configured to engage the valve in the primary pipe system; and
   an actuator engaging an upper portion of the adapter for moving the adapter to cause movement of the valve in the primary pipe system without disengaging the sealing gaske of the secondary containment system about the primary pipe system.

3. The secondary containment system of claim 2 wherein the actuator is selected from the group consisting of a manual handle, a pneumatic actuator and an electric actuator, each of which is interchangeable for engaging the adaptor.

4. The secondary containment system of claim 3 wherein the valve extension adapter comprises:
   a receptacle extending from a surface of the first shell and surrounding an opening in the first shell, the receptacle having an enlarged upper flange that tapers to a neck extending between a second opening in the first shell and the flange,
   the stem extending through the neck, the stem having an outer fitting and an inner fitting for engaging the valve in the primary pipe system; and
   a seal between the stem and the neck.

5. The secondary containment system of claim 4 which further comprises:
   a port in the second shell and a removable sealing plug in the port.

6. The secondary containment system of claim 4 wherein the actuator is a manual handle or an electric actuator, each having a socket for engaging the outer fitting of the stem.

7. The secondary containment system of claim 4 wherein the actuator is a pneumatic actuator that engages an insert that fits over the outer fitting of the stem.

8. A secondary containment system for a primary pipe system having primary pipes connected by a connection point having a valve, said secondary containment system comprising:
- longitudinally divided first and second shells larger than and disposed around the connection point of the primary pipes; each shell having longitudinally extended edges on opposite sides and arcuate openings at opposite ends;
- a sealing gasket having arcuate end portions connected by longitudinally extending strips; and
- a series of removable clamps for clamping the edges of the first and second shells together, with the sealing gasket sandwiched between the two shells, the arcuate end portions of the sealing gasket serving to seal around the pipes and the longitudinally extending strips mating with the longitudinally extending edges of the first and second shells; and
- a valve extension adapter extending through one of the shells, the valve extension adapter being configured to move the valve; and
- wherein the sealing gasket includes arcuate end portions connected by longitudinally extending strips, the arcuate end portions being configured to engage outer surfaces of pipes in the primary piping system, the strips being sandwiched between edges of the first and second shells; and wherein the arcuate end portions of the sealing gasket are split and have interlocking ends.

9. The secondary containment system of claim 8 which further comprises:
- the adapter having a stem, a lower portion of the stem being configured to engage the valve in the primary pipe system; and
- an actuator engaging an upper portion of the adapter for moving the adapter to cause movement of the valve for the primary pipes without disengaging the sealing gasket of the secondary containment system about the primary piping system.

10. The secondary containment system of claim 9 wherein the actuator is selected from the group consisting of a manual handle, a pneumatic actuator and an electric actuator, each of which is interchangeable for engaging the adaptor.

11. The secondary containment system of claim 10 wherein the valve extension adapter comprises:
- a receptacle extending from a surface of the first shell and surrounding an opening in the first shell, the receptacle having an enlarged upper flange that tapers to a neck extending between an opening in the first shell and the flange,
- the stem extending through the neck, the stem having an outer fitting and an inner fitting for engaging the valve in the primary pipe system; and
- a seal between the stem and the neck.

12. The secondary containment system of claim 10 wherein the actuator is a manual handle or an electric actuator, each having a socket for engaging the outer fitting of the stem.

13. The secondary containment system of claim 10 wherein the actuator is a pneumatic actuator that engages an insert that fits over the outer fitting of the stem.

14. The secondary containment system of claim 8 which further comprises:
- a port in the second shell and a removable sealing plug in the port.

* * * * *